United States Patent [19]

Albrecht et al.

[11] Patent Number: 5,305,345
[45] Date of Patent: Apr. 19, 1994

[54] ZIGZAG LASER WITH REDUCED OPTICAL DISTORTION

[75] Inventors: Georg F. Albrecht, Livermore; Brian Comaskey, Stockton; Steven B. Sutton, Manteca, all of Calif.

[73] Assignee: The United States of America as represented by the United States Department of Energy, Washington, D.C.

[21] Appl. No.: 950,559

[22] Filed: Sep. 25, 1992

[51] Int. Cl.$^5$ .............................................. H01S 3/09
[52] U.S. Cl. .......................................... 372/69; 372/70
[58] Field of Search ....................... 372/40, 66, 69, 70, 372/75

[56] References Cited

U.S. PATENT DOCUMENTS

| | | | |
|---|---|---|---|
| 3,633,126 | 1/1972 | Martin | 331/94.5 |
| 3,679,996 | 7/1972 | Almasi et al. | 331/94.5 |
| 3,798,571 | 3/1974 | Segre | 372/40 |
| 3,810,041 | 5/1974 | Martin | 331/94.5 |
| 4,439,861 | 3/1984 | Bradford | 372/70 |
| 4,578,793 | 3/1986 | Kane et al. | 372/94 |
| 4,642,809 | 2/1987 | Petheram | 372/66 |
| 4,713,822 | 12/1987 | Lee | 372/75 |
| 5,181,223 | 1/1993 | Baer | 372/70 |

OTHER PUBLICATIONS

Chan, "Multipass Laser Diode Pumped Nd:YAG Amplifier Design";, Applied Optics, vol. 26 No. 16, pp. 3177-3179, Aug. 15, 1987.
Comaskey et al. "High Average Power Diode Pumped Slab Laser", IEEE Journal of Quantum Electronics, (UCRL-JC-108447) Jun. 1991.
Comaskey et al., "Diode Pumped 275 Watt Average Power Nd:YAG Slab Laser", SPIE OE LASE'92, Los Angeles, Calif., Jan. 19-25, 1992.

Primary Examiner—Rodney B. Bovernick
Assistant Examiner—Robert E. Wise
Attorney, Agent, or Firm—Henry P. Sartorio; Roger S. Gaither; William R. Moser

[57] ABSTRACT

The architecture of the present invention has been driven by the need to solve the beam quality problems inherent in Brewster's angle tipped slab lasers. The entrance and exit faces of a solid state slab laser are cut perpendicular with respect to the pump face, thus intrinsically eliminating distortion caused by the unpumped Brewster's angled faces. For a given zigzag angle, the residual distortions inherent in the remaining unpumped or lightly pumped ends may be reduced further by tailoring the pump intensity at these ends.

19 Claims, 4 Drawing Sheets

ZIGZAG LASER WITH REDUCED OPTICAL DISTORTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

This invention relates to a method and apparatus for reducing thermally induced optical distortions in zigzag lasers and amplifiers. More specifically, it relates to an article comprised of a solid state slab laser gain material which has a entrance face and a return face both cut perpendicular with respect to a pump face and having an optical pumping means comprised of diodes with spacing that is tailored at the slab ends to reduce residual end distortions. One embodiment of the invention includes a highly reflective coating bonded to the return face.

2. Description of Related Art

The architecture of most solid state zigzag lasers and amplifiers consists of a slab lasing medium comprised of solid state lasing material having entrance and exit faces cut at Brewster's angle. Beam quality in average power operation has not been good in these lasers. This performance failure is caused by the complementary interplay of different end effects. Slab geometry lasers with zigzag optical paths have been the object of significant research as a source of high average powers (in the kilowatt range) with good beam quality. Good beam quality is necessary to produce the small spot sizes required for industrial applications such as laser welding. Military uses requiring large propagation distances dictate good beam quality also.

Minimal optical distortion in the laser gain media is necessary to achieve good laser beam quality. Several possibilities for corrective measures exist. By meticulously tailoring masks at the slab ends, the optical path variations through the aperture of the slab laser are controlled. This method, however, is fixed operating point dependent and difficult to achieve. Another method is to place corrective optics in the resonator cavity, or to use active mirrors (phase conjugation techniques) which change shape in response to phase errors in the laser wave front. These methods correct beam quality as an afterthought, are difficult and expensive to implement, and introduce considerable additional complexity into otherwise simple systems.

The architecture of the present invention has been described by Kinpui Chan. See "Multipass Laser Diode Pumped Nd: YAG Amplifier Design", *Applied Optics*, Vol. 26 No. 16, pp. 3177-3179, Aug. 15, 1987. The context of Chan's paper is unrelated to the reduction of beam distortions in solid state slab lasers. Chan's paper is exclusively concerned with multi-pass amplification of miniature lasers. The paper describes an idea only, not the results of an experiment, and does not allude to high average power or continuous-wave operation or associated beam quality problems and their resolutions. Neither Chan nor others working in this field have recognized that a solid state slab laser with square ends will produce an output beam with reduced thermally induced optical distortions. These advantages have been recognized for the first time in the present invention.

It is desirable to have a general method and article capable of producing good laser beam quality from solid state slab lasers by reducing thermally induced optical distortions. The present invention provides such a method and article.

SUMMARY OF THE INVENTION

It is the object of the present invention to reduce thermally induced optical distortions in solid state slab lasers and amplifiers by providing a slab laser medium with an entrance and return face cut perpendicular with respect to the pump face.

The present invention relates to a method and apparatus for reducing thermally induced optical distortions in solid state slab lasers and amplifiers by producing an apparatus having a entrance face and a return face each cut perpendicular with respect to the pump face, both having minimal slab extension beyond the pumped region. The optical path's angle is adjusted to fill the gain medium. The effects of the residual unpumped ends is further diminished by tailoring the pumped to unpumped transition region using non uniform diode spacing.

BRIEF DESCRIPTION OF THE DRAWINGS

FIG. 4 shows interferometric studies at nearly constant slab heat load:

DETAILED DESCRIPTION OF THE INVENTION

Figure 1A:
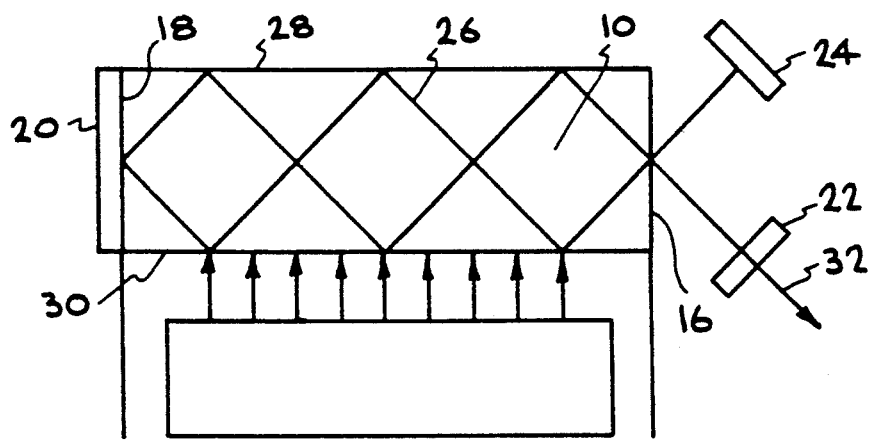
FIGS. 1a and 1b show schematic drawings of a preferred embodiment of the present invention.
Figure 1B:

One specific embodiment of the invention in the form of a folded zigzag laser with reduced optical distortion, shown in FIG. 1, comprises an optically resonant cavity formed by a output coupler 22, a mirror 24, a return face 18, and a slab 10 situated within the cavity. Slab 10 operates as an active lasing medium for wave energy 26 traveling the length of slab 10 between beam entrance face 16 and beam return face 18 thereof. Slab 10 is composed of any solid state crystal or glass suitable to act as a laser medium. Entrance face 16 and return face 18 are cut and optically polished perpendicular with respect to pump faces 12 and 14, as shown in FIG. 1b.

A highly reflective dielectric coating 20, as shown in FIG. 1, is formed on beam return face 18. Slab 10 is optically pumped by laser diodes or other conventional methods, at top boundary 28 or bottom boundary 30 or both, to produce a population inversion. As indicated in FIG. 1, wave energy 26, traveling within slab 10 travels a zigzag path, being totally reflected at top boundary 28 and bottom boundary 30 of slab 10. Mirror 24 is a high reflector and mirror 22 functions as both partial reflector and output coupler, which together with slab 10 induce a folded cavity, thereby producing laser output energy 32.

Figure 6:
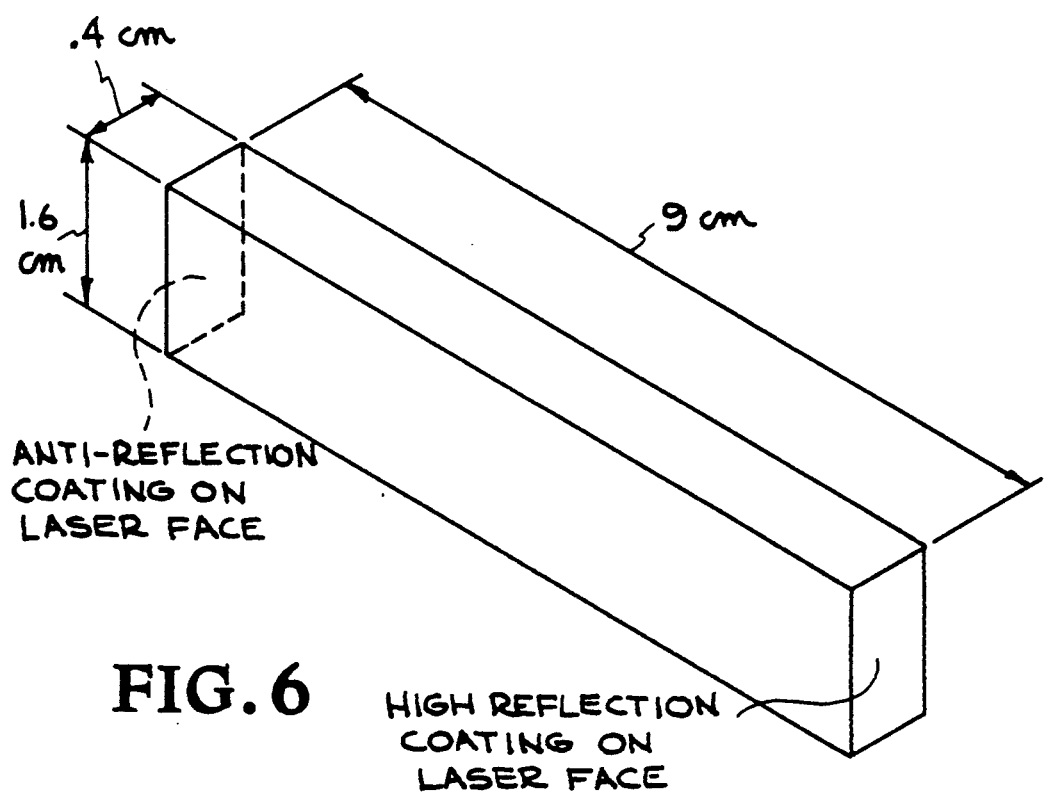
FIG. 6 shows a 9 cm by 1.6 cm by 0.4 cm slab.

One specific embodiment of the invention comprises a diode-array pumped or face-pumped, folded, total-internal-reflection zigzag Nd: YAG slab laser which is operable at high average power. The slab is 9 cm long, 1.6 cm tall, and 0.4 cm thick (FIG. 6). The slab differs from conventional systems in that the ends are cut nearly square to the pump faces. The two large 9 cm by 1.6 cm faces constitute the pump faces, the 0.4 cm by 1.6 cm faces are exposed to the laser light of the lasing cavity, and the 9 cm by 0.4 cm edges on the top and bottom are used to hold the slab.

Figure 2:
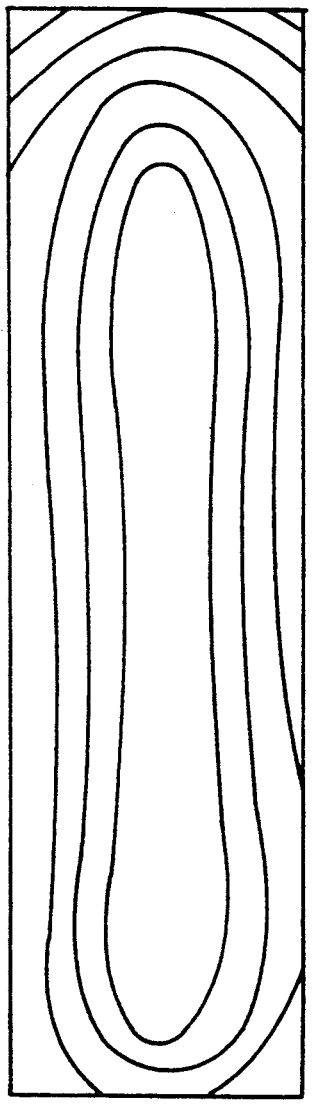
FIG. 2 illustrates the interferogram of a Nd: YAG slab with Brewster's windows.

Coolant is flowed from bottom to top across the pump faces though, in other designs, the coolant is flowed down the length of the slab. One laser face is anti-reflection coated and the other laser face is high reflection coated. Hence, we have a folded zigzag laser configuration in which both external mirrors (a high reflector and an output coupler) reside on one side of the slab. An alternate design uses an anti-reflection coating on both laser faces. Up to 5 kilowatts (peak) of diode pump light is applied to the slab at up to 25% duty factor. This corresponds to a measured heat load of approximately 13 watts per $cm^2$ on the cooling surfaces with a laser performance of 290 watts average power. FIG. 2 illustrates the interferometrically resolved residual optical distortions of the pumped slab to the state of the unloaded slab. The heat loaded interferogram is only mildly disturbed from the unpumped slab.

Figure 3:
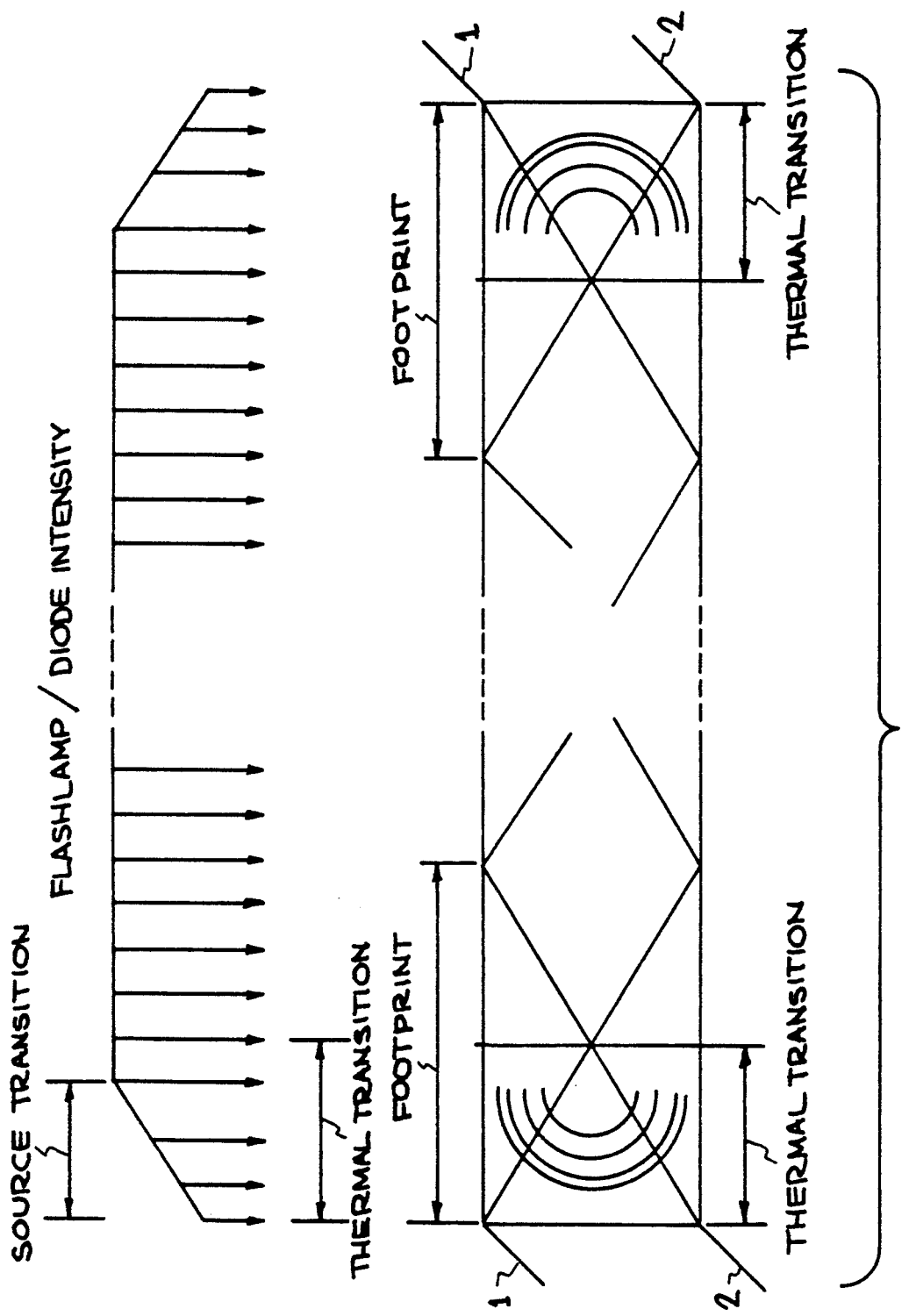
FIG. 3 shows the thermal transition region of a slab laser with matching diode tailoring.
Figure 4A:
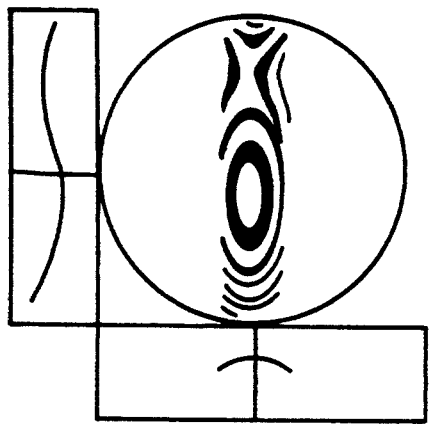
FIG. 4a shows the interferogram for a 1 diamond (1D) optical path when the slab is optically pumped with 80 diodes, unfeathered, at 2 KHz.
Figure 4B:
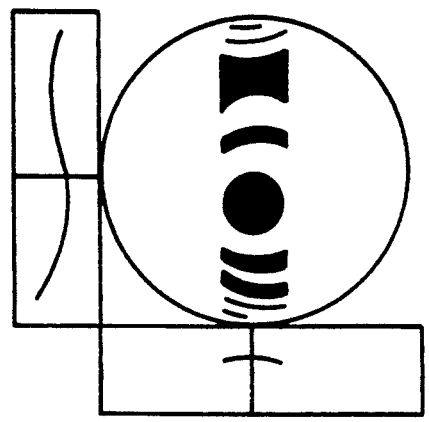
FIG. 4b shows the interferogram for a 3 diamond (3D) optical path when the slab is optically pumped with 80 diodes, unfeathered, at 2 KHz.
Figure 4C:
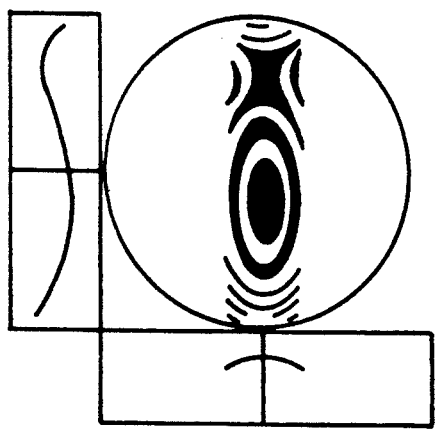
FIG. 4c shows the interferogram for a 1 diamond (1D) optical path when the slab is optically pumped with 68 diodes, feathered, at 2.5 KHz.
Figure 4D:
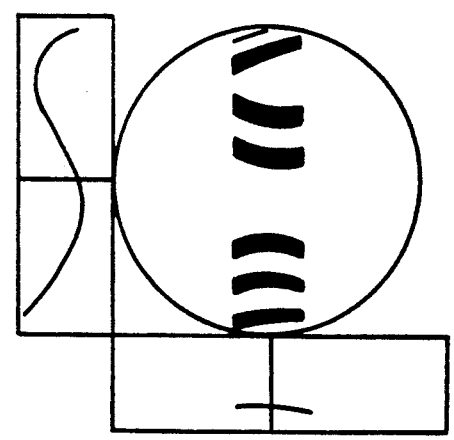
FIG. 4d shows the interferogram for a 3 diamond (3D) optical path when the slab is optically pumped with 68 diodes, feathered, at 2.5 KHz.

In this and any other practical implementation of a square tipped slab, there exists a transitional zone at the ends varying from unpumped or lightly pumped to fully pumped. This is manifested in our data by the progressive reduction in residual distortions under load for steeper zigzag angles (higher order "D's" in FIG. 3). Steeper angles give fuller integration averages of the end distortions across the laser beam wave front. Architecturally, it is not possible to go to arbitrarily steep beam angles. The residual slab end effects can be "fine tuned" by grading the pump diode densities, and thus pump intensity, towards the slab ends. FIG. 4 shows the heat loaded distortions interferometrically for shallow and steep zigzag angles with and without graded spacing (feathering) in the slab end pump diodes. Uniformly spaced straight interference fringes indicate a simple tilt. As a diagnostic tilt is added to observe fringes. Quadratically spaced circular fringes indicate optical focusing or defocusing and constitute an optical issue if a variable power operating point is desired. More complicated fringes represent various orders of optical aberrations which are all highly undesirable. With this in mind it is shown in FIGS. 4a-d that the 3 diamond (3D) zigzag path performs better than the 1 diamond (1D) path. By feathering the optical pump intensity to taper off at the thermal transition regions (FIG. 3), further improvements in the wavefronts are achieved (FIG. 4d). It is clear that wave front averaging is improved for the steep angle case (3D) with diode spacing grading.

Figure 5A:
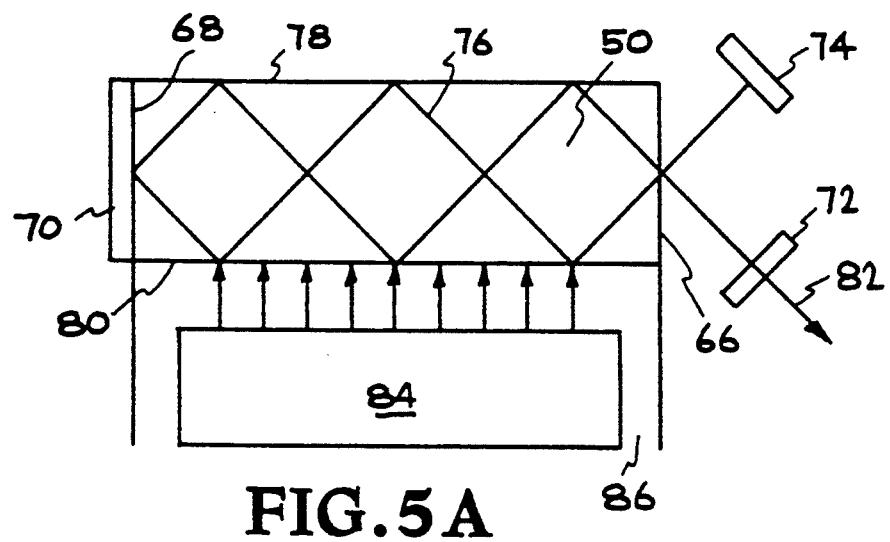
FIGS. 5a and 5b show schematic drawings of a preferred embodiment of the present invention.
Figure 5B:
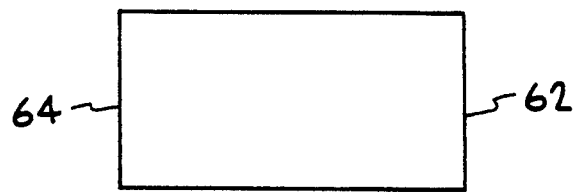

One particular embodiment of the present invention comprises an apparatus for amplifying laser light as shown in FIGS. 5a and 5b. Lateral pump faces 62 and 64 transfer optical energy from excitation mechanism 84. The optical amplifier has beam entrance face 66 and return face 68 both cut perpendicular with respect to lateral pump faces 62 and 64. Laser material 50 is comprised of any solid state laser material and may be cooled by cooling system 86. The spacing of excitation mechanism 84 is tailored to match thermal transition regions within laser material 50 near entrance face 66 and return face 68. The preferred excitation mechanism is comprised of laser diodes. Highly reflective coating 70 is formed on return face 68. Alternatively, an anti-reflection coating is formed on return face 68. The highly reflective coating is preferred. A feedback mechanism forms an optical cavity by placing two or more mirrors near entrance face 66, depending on a desired number of folds or diamonds (D's) within laser medium 50 (see FIGS. 3 and 4). The preferred embodiment has mirrors 72 and 74 oriented to laser material 50 to form an optical feedback mechanism and thereby derive an optical cavity. Mirror 72 functions as a partially reflecting output coupler. In the laser embodiment, optical radiation 76 traverses laser material 50, reflecting from upper surface 78 and lower surface 80, to exit through the partially reflective coating of mirror 72, to form output beam 82. To function purely as a laser amplifier, mirrors 74 and 72 are omitted and a laser beam is injected, at the mirror 74 point, into laser material 50 and the amplified beam exits at the mirror 72 point. Operation of this laser or amplifier is most advantageous in the high average power mode (output powers of 50 watts or greater).

Changes and modifications in the specifically described embodiments can be carried out without departing from the scope of the invention, which is intended to be limited by the scope of the appended claims.

We claim:

1. An apparatus for amplifying laser light comprising:
   (a) a solid state, slab geometry laser medium comprising:
      (1) lateral pump faces;
      (2) a beam entrance face cut perpendicular with respect to the pump faces;
      (3) a beam return face cut perpendicular with respect to the pump faces;
   (b) an excitation mechanism located along said laser medium comprising:
      (1) a first set of laser diodes producing a uniform intensity distribution along a central portion of said laser medium;
      (2) a second set of laser diodes producing a non-uniform intensity distribution along outer portions of said laser medium to provide a gradual reduction of optical excitation from said central portion to said entrance and return faces; and
   (c) a cooling system.

2. An apparatus as recited in claim 1, wherein said laser diodes are spaced from each other to conform to thermal transition regions within said laser medium near said entrance and return faces.

3. An apparatus as recited in claim 2, wherein a highly reflective coating is formed on said return face.

4. An apparatus as recited in claim 3, further comprising an optical feedback mechanism.

5. An apparatus as recited in claim 4, further comprising a laser beam output coupler.

6. An apparatus as recited in claim 5, wherein said optical cavity comprises two external mirrors located near the entrance face, one of which is a high reflector and the other functioning as both partial reflector and output coupler.

7. An apparatus as recited in claim 5, wherein said optical cavity comprises any number of external high reflectors, depending on a desired number of folds within said laser medium.

8. An apparatus as recited in claim 7, having an output beam characterized by reduced thermally induced optical distortion, said apparatus operable at high average power.

9. An apparatus as recited in claim 2, wherein an anti-reflection coating is formed on said return face.

10. An apparatus for amplifying laser light comprising:
   (a) a solid state slab geometry laser medium comprising:
       (1) lateral pump faces;
       (2) a beam entrance face cut perpendicular with respect to the pump faces;
       (3) a beam return face cut perpendicular with respect to the pump faces;
   (b) an excitation mechanism comprising a plurality of laser diodes located along said laser medium, and wherein a portion of said laser diodes are uniformly spaced over a central region of said laser medium to provide a uniform optical excitation, and wherein a portion of said laser diodes are non-uniformly spaced from each end of said central region to said entrance and return faces respectively, providing a gradual reduction of optical excitation from said central region to said entrance and return faces; and
   (c) a cooling system.

11. A method of amplifying laser light comprising:
   (a) providing a slab of solid state laser material having lateral pump faces;
   (b) cutting an entrance face onto said slab such that it is oriented perpendicular with respect to said lateral pump faces;
   (c) cutting a return face onto said slab such that it is oriented perpendicular with respect to said lateral pump faces;
   (d) optically polishing said entrance face;
   (e) optically polishing said return face;
   (f) optically pumping a central portion of said laser slab with a first set of laser diodes producing a uniform intensity distribution along said central portion;
   (g) optically pumping outer portions of said laser slab with a second set of laser diodes to produce a non-uniform intensity distribution along said outer portions; and
   (h) cooling said laser slab.

12. A method of amplifying laser light as recited in claim 11, additionally including the step of spacing said laser diodes from each other to conform to thermal transition regions within said laser medium near said entrance and return faces.

13. A method of producing an apparatus for amplifying laser light as recited in claim 12, additionally including a step of forming a highly reflective coating on said return face.

14. A method of producing an apparatus for amplifying laser light as recited in claim 13, additionally including a step of forming an optical cavity by providing a feedback mechanism.

15. A method of producing an apparatus for amplifying laser light as recited in claim 14, additionally including a step of providing an output coupler to allow a laser beam to exit said optical cavity.

16. A method of producing an apparatus for amplifying laser light as recited in claim 15, additionally including a step wherein an angle between said external mirrors is varied to optimize said beam path through said laser material.

17. A method of producing an apparatus for amplifying laser light as recited in claim 15, additionally including a step of providing any number of external mirrors depending on a desired number of folds within said cavity.

18. A method of producing an apparatus for amplifying laser light as recited in claim 12, additionally including a step of forming an anti-reflection coating on said return face.

19. A method of producing an apparatus for amplifying laser light as recited in claim 14, wherein said laser is operable at high average power.

* * * * *